J. E. DUSTIN.
AUTOMATIC TRAP NEST.
APPLICATION FILED SEPT. 18, 1911.
1,024,319.
Patented Apr. 23, 1912.
3 SHEETS—SHEET 3.
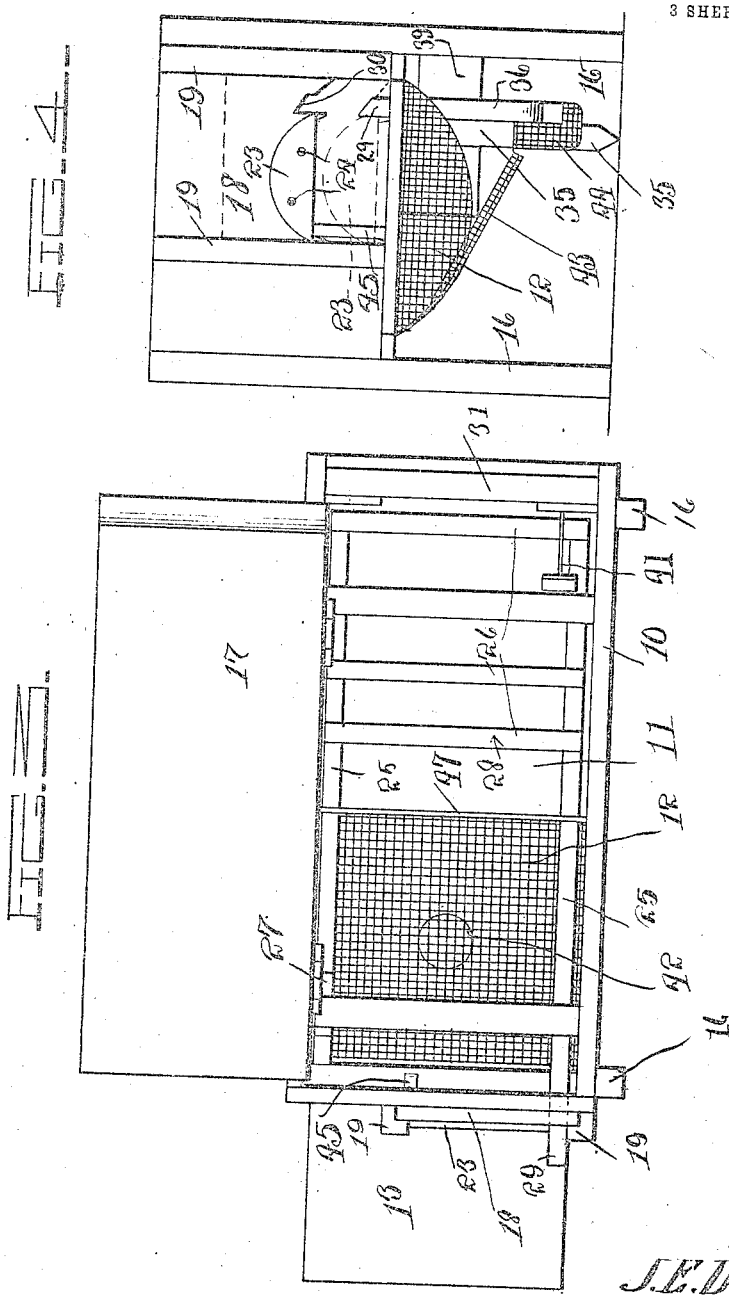
Witnesses
F. W. Taylor
Francis Boyle
Inventor
J. E. Dustin
By Chandler & Chandler
Attorneys

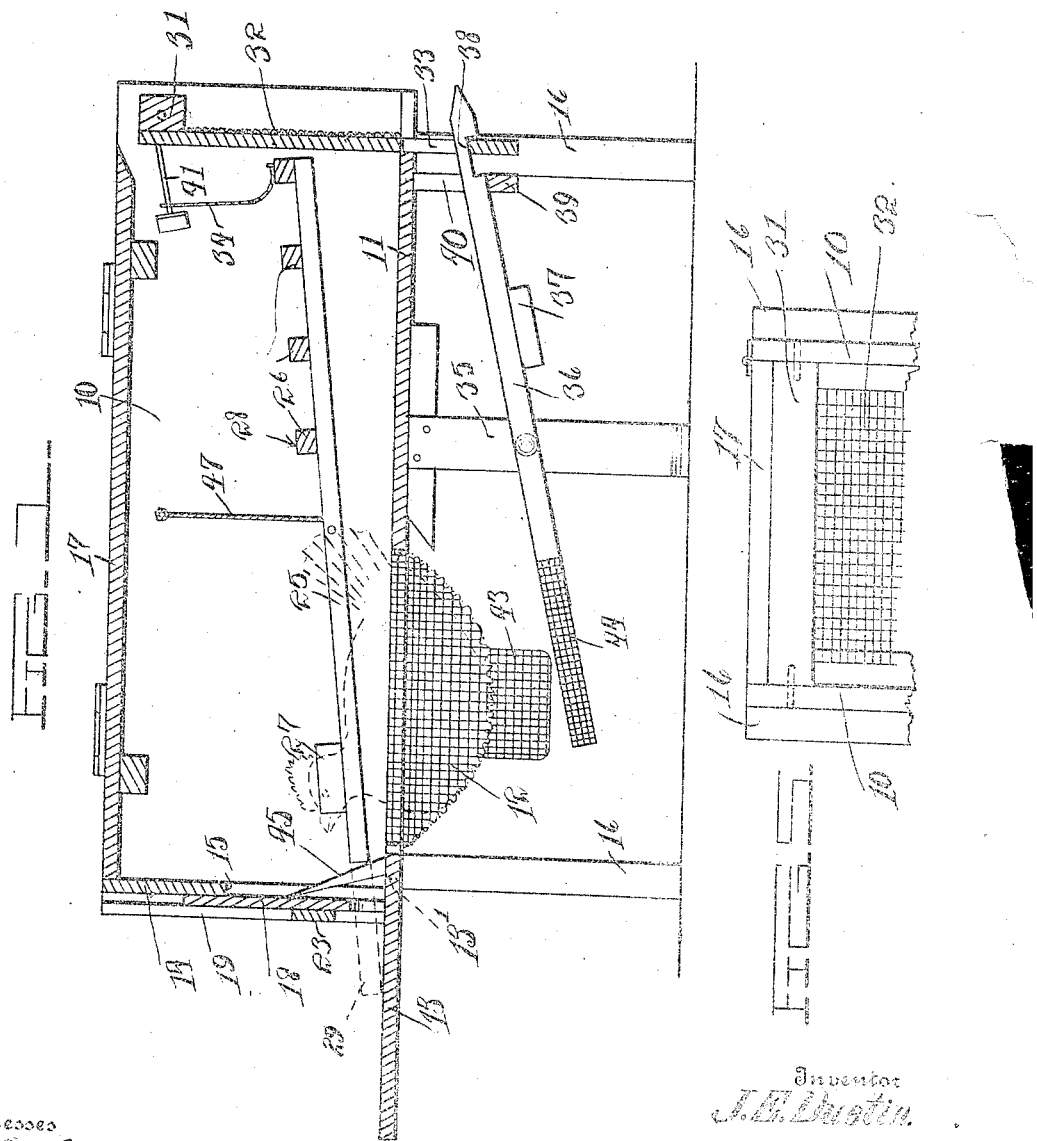

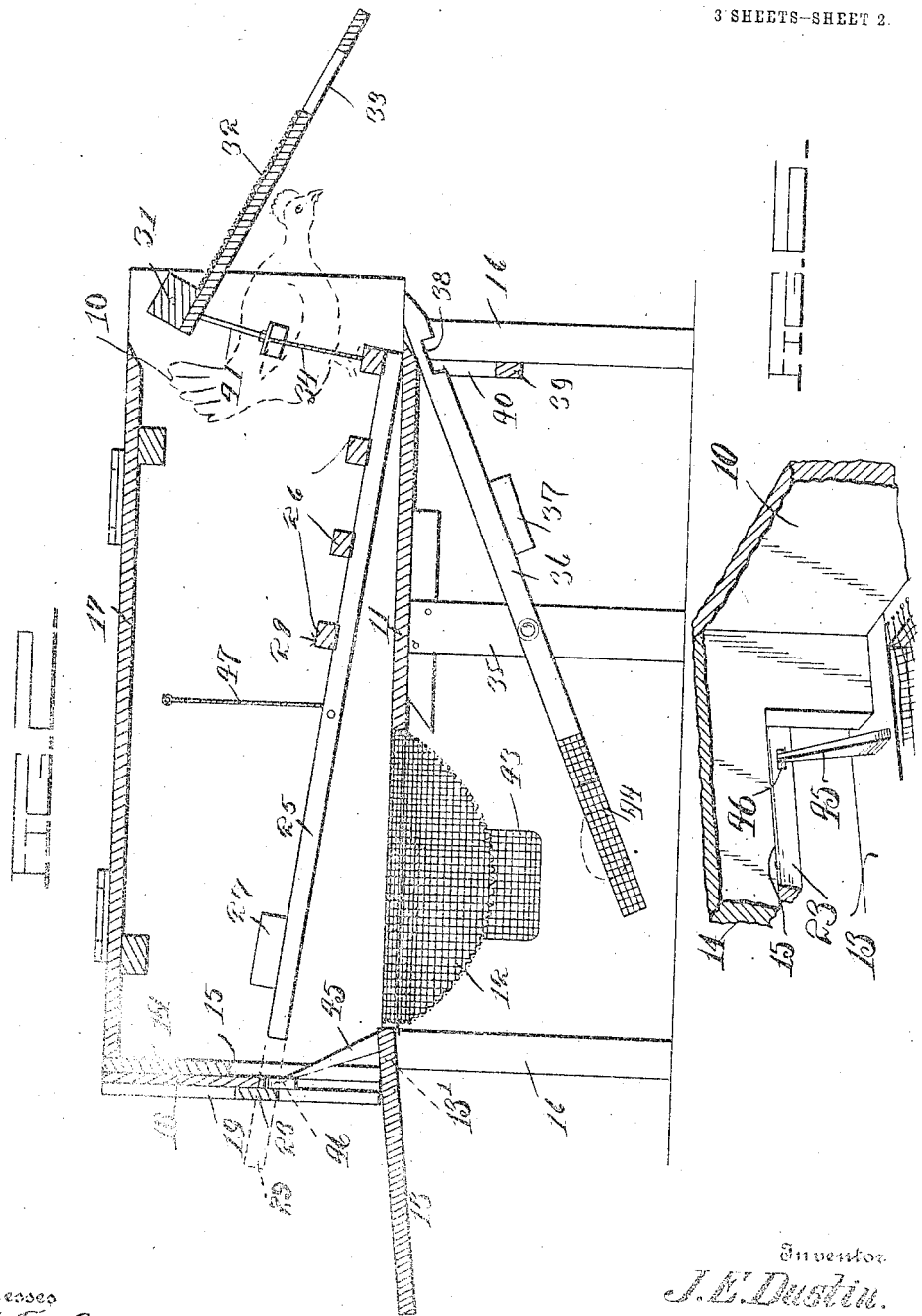

UNITED STATES PATENT OFFICE.

JOHN E. DUSTIN, OF PITTSFIELD, NEW HAMPSHIRE.

AUTOMATIC TRAP-NEST.

1,024,319.

Specification of Letters Patent. Patented Apr. 23, 1912.

Application filed September 18, 1911. Serial No. 649,778.

*To all whom it may concern:*

Be it known that I, JOHN E. DUSTIN, a citizen of the United States, residing at Pittsfield, in the county of Merrimack, State of New Hampshire, have invented certain new and useful Improvements in Automatic Trap-Nests; and I do hereby declare the following to be a full, clear, and exact description of the invention, such as will enable others skilled in the art to which it appertains to make and use the same.

This invention relates to trap nests and has for an object to provide a nest in which the hen is trapped in until after laying, the weight of the egg unlocking a door from which the hen departs, the hen being made to pass over a tilting platform upon departing which will open the entrance door to operative position.

With the above object in view the invention consists in certain novel details of construction and combination of parts hereinafter fully described and claimed, it being understood that various modifications may be made in the minor details of construction within the scope of the appended claims.

In the accompanying drawings forming part of this specification:—Figure 1 is a longitudinal sectional view through the nest. Fig. 2 is a longitudinal sectional view through the nest showing the tilting platform depressed. Fig. 3 is a plan view of the nest. Fig. 4 is a front elevation of the nest showing the entrance door in open position and dotted in closed position. Fig. 5 is a fragmentary rear end elevation of the nest. Fig. 6 is a fragmentary view showing the door locking means.

The nest comprising the subject-matter of this invention is in the form of a box open at one end and consisting of spaced side walls 10, the lower edges of which are connected by a bottom wall 11, which is cut away to receive a downwardly bowed wire mesh nest 12. A platform 13 is pivotally connected to the side walls by pins 13′, and forms an extension of the bottom, the hen being compelled to tread upon this platform when entering the nest. The end edges of the side walls are connected by a front wall 14 which is provided with a door opening 15. Supporting legs 16 are arranged at the corners of the nest thus formed and space the bottom of the nest considerably above the ground. For permitting of access to the interior of the nest for cleaning and repairs, a hinged cover 17 is arranged to close the open top of the nest.

An entrance door 18 is slidably fitted to the front wall 14 through the instrumentality of angle iron guide bars 19 which embrace the longitudinal edge portions of the door.

The lower edge of the door arches upwardly, and arranged upon the outer face of the nest is a semicircular slide 23, this slide being adjustably secured through the instrumentality of spaced screws or the like 24. The slide is utilized in sealing any desired amount of the orifice formed by the arched lower edge of the door to adapt the door to various sized hens.

Centrally pivoted on the inner faces of the side walls are levers 25 which are of sufficient length to extend nearly the entire length of the side walls. A plurality of spaced slats 26 connect these levers remote from the entrance door. A weight 27 is attached to one of the levers adjacent to the entrance door, and normally holds the opposite ends of the levers elevated. It will be here stated that the last named ends of the levers together with the slats above mentioned form a tilting platform which is designated in general by the numeral 28. One of the levers is provided with an extension 29 which projects through a vertically disposed slot 30 formed in the entrance door.

Suppose the hen to have laid an egg and to have advanced upon the tilting platform as shown in Fig. 2. The latter will gravitate, thereby lifting the extension 29 vertically and upon this movement of the parts the entrance door will be raised. The door will be held in this raised position by a novel catch which will be presently described. When the hen steps off from the trap door upon departing from the nest the extension will gravitate so as not to obstruct gravitation of the entrance door upon the next succeeding hen entering the nest.

Pivoted near its upper corners to the side walls is a substantially U-shaped door frame 31 the sides of which are connected by a screen element 32. The door thus formed will be hereinafter referred to as the departure door. One leg of the U-shaped frame extends below the bottom 11 and is there equipped with a longitudinal slot 33. A cable 34 is terminally connected to the tilting platform and to the departure door as shown. By means of this cable, when the tilting platform is depressed, the departure door is swung open, this swinging open of the door taking place after the operation of an egg controlled latch which will now be described.

Depending from the bottom of the nest is an arm 35 upon which is centrally pivoted a latch 36, one end of the latch being weighted as shown at 37 and being furthermore provided with a notch 38 which engages in the notch 33 of the departure door when the weighted end of the latch is in its lowest limit of movement, gravitating movement of this end of the latch being limited by an arm 39 which is attached to one of the supporting legs 16 of the nest and is provided with a guide notch 40 for the reception of the latch. Upon rocking open of the latch, the latter disengages from the notch in the departure door whereupon the departure door is free to rock open, this rocking open of the door being instantaneous due to the action of a weight 41 attached to the upper rail of the departure door frame. As above stated this rocking open of the latch is attained through the instrumentality of the egg laid by the hen, and to attain this end, an opening 42 is formed in the downwardly bowed screen element of the nest, this opening registering with a downwardly inclined egg chute 43 fixed to the bottom of the nest and which in turn registers at its discharge end with a second egg chute 44 which is attached to the free end of the latch and from which the egg rolls into the receptacle designed for its reception. Upon gravitation of the egg into the egg chute of the latch the latter will be rocked upon its pivot and will release the departure door as above described. The departure when released is rocked slightly open through the instrumentality of the above described weight so that an opening exists between the lower edge of the door and the bottom of the nest and upon the hen attempting to escape from this opening it must traverse the entire length of the tilting platform and thus the departure door will be swung to its full open position through the instrumentality of the cable. Simultaneously with this swinging of the departure door to its full open position the entrance door will be elevated and the locking means therefor which will now be described rocked to operative position.

Arranged on the tilting platform 13 is an inclined finger 45 which normally bears with its tip upon the inner face of the door and engages in a notch 46 when the door is raised, thereby locking the door against gravitating. The finger disengages from the door upon the hen stepping to the inner end of the platform, and releases the door so that the latter gravitates and traps the hen after the hen has entered the nest. A curtain 47 divides the nest.

What is claimed, is:—

1. A nest including a casing, a vertically movable entrance trap door, a tilting platform within the casing, an extension on said platform engaged through a slot in said entrance door and operating upon depression of said platform to lift said entrance door to open position, a swinging departure door pivoted adjacent to its upper corners to the casing, and a connection between said departure door and said platform operating to swing said departure door to open position upon depression of said platform.

2. In a nest an entrance door, operating means therefor, a tilting platform, a swinging departure door, a connection between said platform and said departure door operating to swing the latter open upon depression of said platform, said departure door being provided with a depending slotted extension, a pivoted latch below the nest having one end lockingly engaged in the slot of said extension, an egg chute adapted to direct an egg from the interior of said casing to the free end of said latch whereby the weight of said egg rocks said latch and releases the same from said departure door, and a weight assembled with said departure door serving to rock the door partly open upon release of said latch and prior to the operation of said tilting platform.

In testimony whereof, I affix my signature, in presence of two witnesses.

JOHN E. DUSTIN.

Witnesses:
CLARK C. HALL,
NEWMAN H. SELDON.